(12) United States Patent
Winzinger et al.

(10) Patent No.: US 8,696,956 B2
(45) Date of Patent: Apr. 15, 2014

(54) BLOW MOULDING MACHINE WITH CLEANING SYSTEM

(75) Inventors: Frank Winzinger, Regensburg (DE); Ulrich Lappe, Regensburg (DE)

(73) Assignee: Krones AG, Neutraubling (DE)

( * ) Notice: Subject to any disclaimer, the term of this patent is extended or adjusted under 35 U.S.C. 154(b) by 425 days.

(21) Appl. No.: 12/852,156

(22) Filed: Aug. 6, 2010

(65) Prior Publication Data

US 2011/0037187 A1      Feb. 17, 2011

(30) Foreign Application Priority Data

Aug. 11, 2009   (DE) .......................... 10 2009 036 922

(51) Int. Cl.
*B29C 49/12*   (2006.01)
*B29C 49/42*   (2006.01)

(52) U.S. Cl.
USPC ............. 264/39; 425/225; 425/229; 425/522; 425/529

(58) Field of Classification Search
USPC ................. 425/225, 226, 227, 229, 522, 529; 264/39
See application file for complete search history.

(56) References Cited

U.S. PATENT DOCUMENTS

| 7,481,636 B2 * | 1/2009 | Volker et al. .................. 425/540 |
| 2010/0089009 A1 | 4/2010 | Till |
| 2010/0303946 A1 * | 12/2010 | Voth .............................. 425/226 |

FOREIGN PATENT DOCUMENTS

| DE | 10064167 A1 * | 7/2002 |
| DE | 200 23 423 U1 | 4/2004 |
| JP | 03049926 A * | 3/1991 |
| WO | 2008/125216 A2 | 10/2008 |
| WO | 2010/020530 A1 | 2/2010 |

OTHER PUBLICATIONS

Partial machine translation of DE 10064167 A1 dated Jul. 2002 obtained from the esp@ce website.*

* cited by examiner

*Primary Examiner* — Robert B Davis
(74) *Attorney, Agent, or Firm* — Novak Druce Connolly Bove + Quigg LLP

(57) ABSTRACT

An apparatus for transforming plastic preforms into containers may include at least one blow mould which forms a cavity, inside which the plastic preforms can be transformed into containers. The apparatus may include a pressure application device for applying a medium to the plastic preforms in order to expand the preforms against an inner wall of the blow mould delimiting the cavity. The apparatus may include a stretching rod for stretching the plastic preforms in the longitudinal direction. The apparatus may include a cleaning device for cleaning regions of the blow mould. The cleaning device may include at least one outlet opening for a cleaning medium for cleaning the blow mould, and this outlet opening is arranged at least at times inside the blow mould.

23 Claims, 7 Drawing Sheets

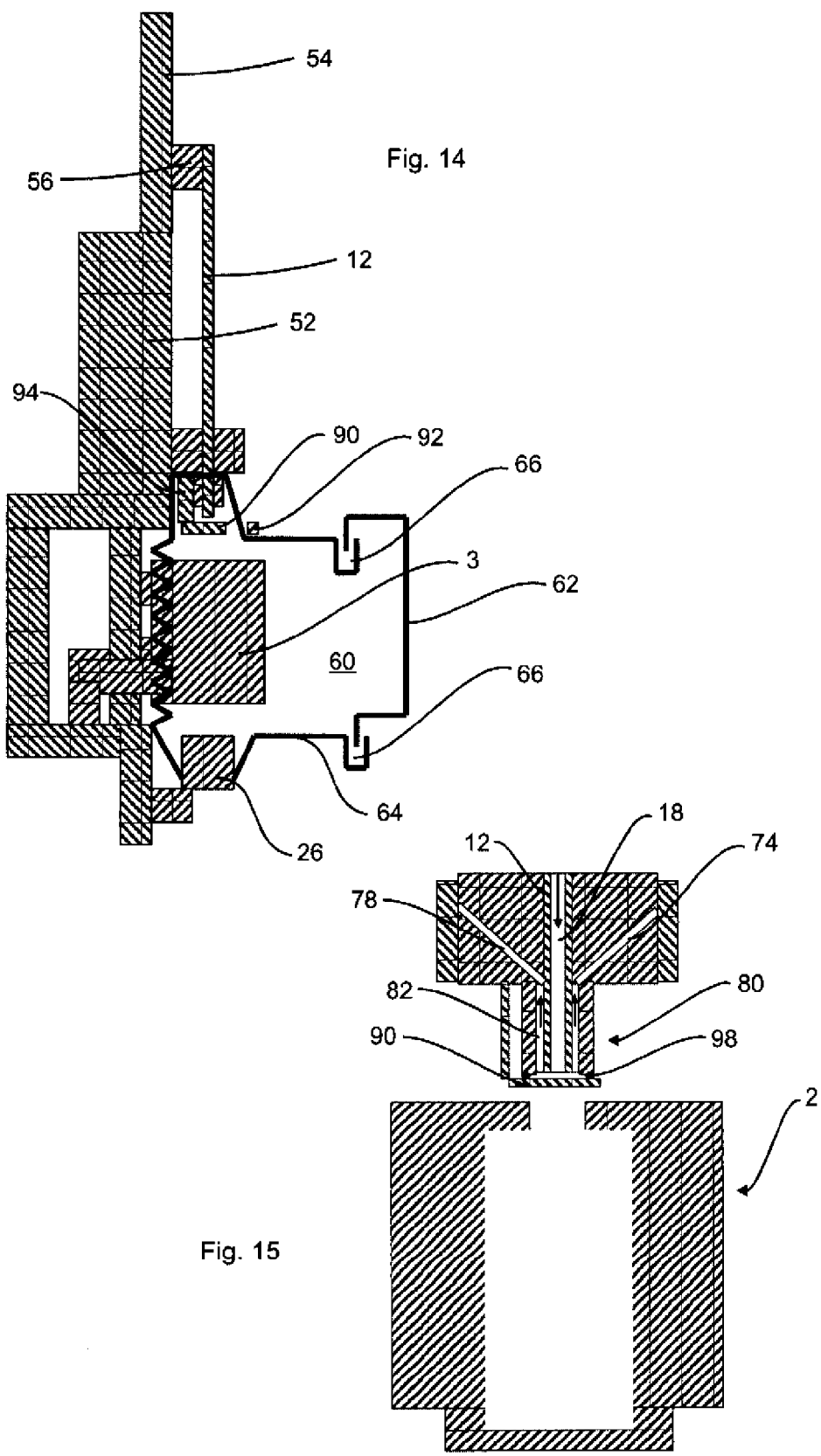

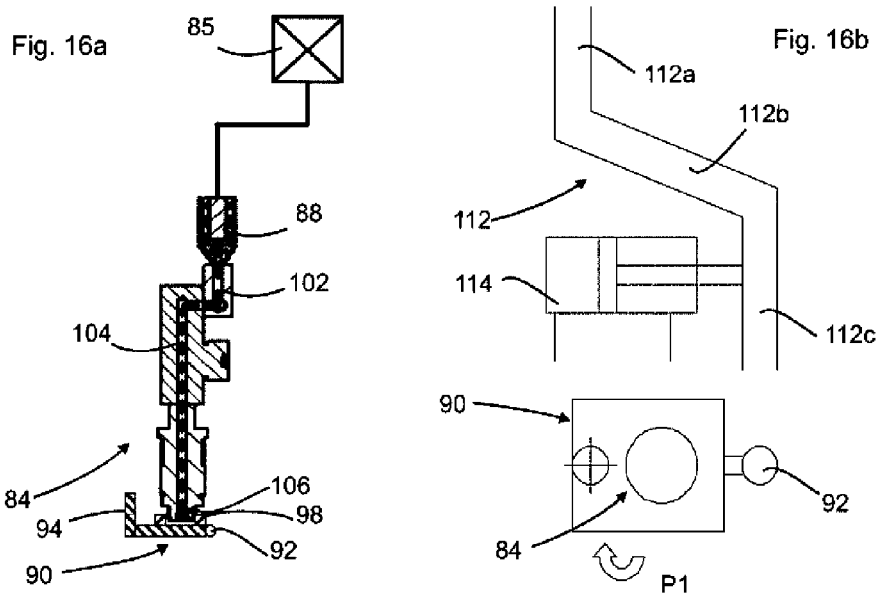
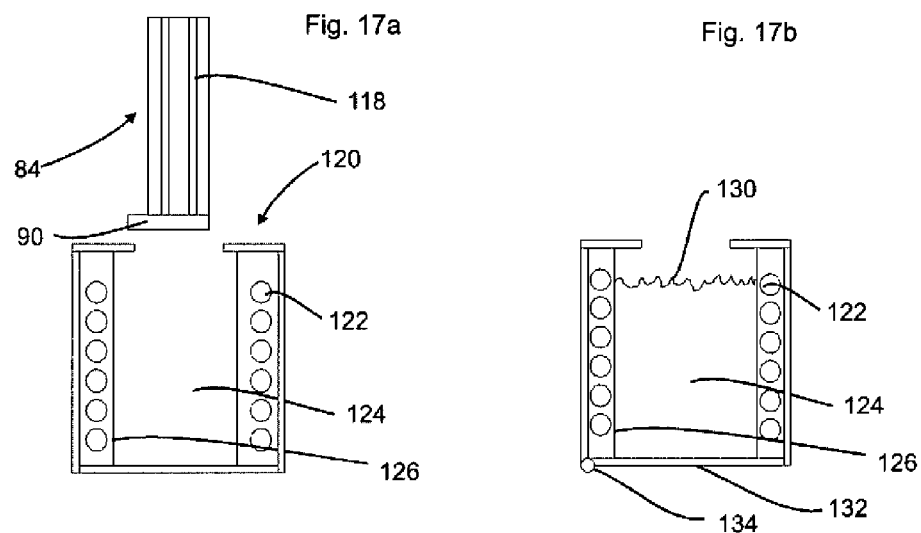
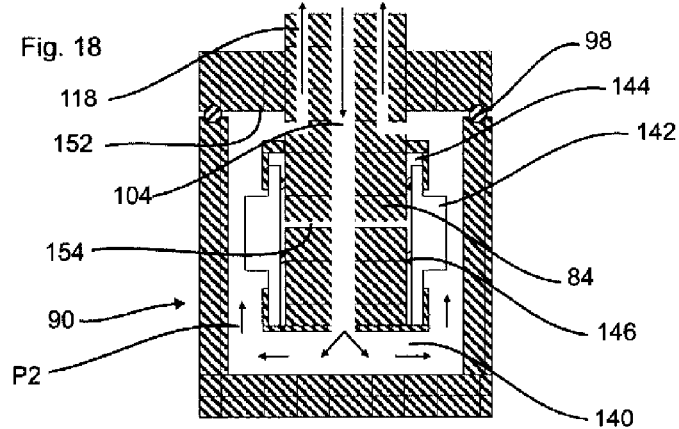

BLOW MOULDING MACHINE WITH CLEANING SYSTEM

CROSS-REFERENCE TO RELATED APPLICATION

This application claims the benefit of priority of German Patent Application No. 10 2009 036 922.8, filed Aug. 11, 2009, pursuant to 35 U.S.C. 119(a)-(d), the disclosure of which is incorporated herein by reference in its entirety as if fully set forth herein.

TECHNICAL FIELD

The present disclosure relates generally to apparatuses for transforming plastic preforms into plastic containers and, in particular, to blow moulding machines with a cleaning system.

BACKGROUND

Apparatuses for moulding plastic preforms into plastic containers have been known from the prior art for a long time. Some conventional blow moulding machines comprise a blow mould, inside which the plastic preforms are expanded through the application of pressure to form plastic containers. During this stretch-blow moulding of plastic containers, so-called oligomers, i.e. short-chain molecules or foreign substances, are excreted onto the blow mould from the plastic of the plastic preforms. The surface of these blow moulds therefore becomes dull and in the extreme case rough as it becomes increasingly soiled. However, this has negative effects on the bottle quality, since this may lead to the situation whereby the bottle appearance may become cloudy on account of the dull blow moulds or else the cooling on the mould surface is reduced as a result of the roughness.

Since both of these problems are unacceptable, the blow moulds must be cleaned and usually polished at regular intervals. Particularly high degrees of soiling by oligomers occur when working with high mould temperatures for process reasons (e.g. in the case of hot fill processes), since soiling is much faster with hot moulds and the cleaning of the moulds in the hot state can be carried out only with a safety risk due to the risk of burning. Particularly in the case of a so-called hot filling installation with a blow moulding machine and a filler block, this cleaning of the moulds is often a very negative aspect. Another aspect for the cleaning of blow moulds, even in the case of so-called cold moulds (e.g. below 100° C.), is hygiene. Particularly when bottling sensitive products, it is important to avoid as far as possible any spreading of germs or spores on the outer wall of the bottle in the filler region. Regular and good cleaning of the blow moulds helps to ensure this. Cleaning is thus always to be understood also to mean a reduction in germs and spores.

A container production apparatus and a production method for moulded bodies are known from WO 2008 125216 A2. In this case, a radiation device is arranged at or on the blow moulding machine, the radiation being directed at least onto one region of the blow moulding machine.

It may therefore be desirable to simplify the cleaning of such blow moulding machines and to provide an automated method for cleaning blow moulds.

SUMMARY OF INVENTION

An apparatus according to the disclosure for transforming plastic preforms into containers may comprise at least one blow mould which forms a cavity, inside which the plastic preforms can be transformed into containers. The apparatus may also comprise a pressure application device for applying a medium to the plastic preforms in order to expand the latter against an inner wall of the blow mould delimiting the cavity. Also provided is a stretching rod for stretching the plastic preforms in the longitudinal direction thereof, wherein the apparatus comprises a cleaning device for cleaning regions of the blow mould.

According to the disclosure, the cleaning device comprises at least one outlet opening for a cleaning medium for cleaning the blow mould, and this outlet opening is arranged at least at times inside the blow mould.

By virtue of this procedure, a cleaning of the blow mould in particular during ongoing operation is possible, without operation of the apparatus having to be stopped for a relatively long time for this purpose. It is thus possible to apply the cleaning medium to the blow mould at regular intervals. Furthermore, the arrangement of this outlet opening also permits a cleaning of the blow mould in a closed state.

The blow mould may thus be able also to be transferred from a closed to an open state.

In some aspects, the stretching rod is movable relative to the plastic preforms or the threads thereof in the longitudinal direction of the plastic preforms.

The pressure application device may comprise a blowing nozzle which applies the gaseous medium, such as, for example, air, to the containers via the mouth of the latter.

In order to compensate for the abovementioned disadvantages, it is therefore proposed to provide for the use of an automatic cleaning process. The cleaning device may thus be able to carry out the cleaning of the containers in an automated manner. It is also possible to retrofit the cleaning device on already existing machines. Furthermore, by virtue of the proposed procedure, the blow mould or the entire mould carrier can be kept closed during sterilisation, and there is therefore no risk that the sterilising medium will be applied to the entire blow moulding machine, including the greased cam bearings thereof. In this way, possible corrosion damage can be avoided.

According to some aspects, the apparatus has a reservoir for the sterilising medium and a rotary distributor. It would also be possible to provide on each blowing station a dedicated reservoir for the sterilising medium, which can be filled cyclically.

Suitable cleaning agents are those substances which can be used to clean (CIP cleaning) the outside and inside of machines and installations in the beverage-bottling industry. Examples of such cleaning agents are sodium hydroxide (NaOH), acidic cleaning agents based on phosphoric acid, acidic cleaning agents based on nitric acid, disinfecting agents based on acetic acid, ozone, hydrogen peroxide, chloralkali cleaning agents, hot water or steam. In addition, chlorine dioxide could also be used as the cleaning agent.

In some embodiments, the outlet opening is designed as a nozzle for the cleaning medium. It would also be possible that a plurality of nozzles are provided, so that larger areas of the inner wall or even the entire inner wall can be sprayed or wetted in some other way.

In some exemplary embodiments, the blow mould has two side parts which can be pivoted away from one another and which in a closed state form the cavity in their interior. During operation, a preform is placed into the blow mould in a moved-apart state of the mould halves and then the mould halves are closed and finally the plastic preform is expanded to form the container.

In various embodiments, the blow mould has a bottom part. This bottom part may be advantageously separate from the side parts and closes the blow mould in the downward direction.

In some exemplary embodiments, at least one outlet opening is arranged in the stretching rod, in a bottom part of the blow mould and/or the pressure application device. In this way it is possible that the cleaning medium can be introduced via the stretching rod, via the bottom part of the blow mould or else the pressure application device, such as for example the blowing nozzle.

However, it would also be possible that a plurality of outlet openings or nozzles are arranged in the bottom mould or also a plurality of outlet openings in the stretching rod of the pressure application device. Outlet openings could also be provided both in the bottom part and in the stretching rods or both in the stretching rod and in the pressure application device or both in the bottom part and the pressure application device.

In some embodiments, the stretching rod has an end section pointing towards a bottom of the containers and the outlet opening is arranged in this end section. This end section is the section of the stretching rod which protrudes as far as the bottom of the plastic preforms during the stretching process.

In some exemplary embodiments, the stretching rod has a plurality of outlet openings which are distributed, in particular evenly distributed, in the circumferential direction. Advantageously, these openings may be oriented at an angle, so that the medium emerges at an angle from these openings. In this way it is possible to apply the cleaning medium to the entire wall of the blow mould in the circumferential direction. It would also be possible to configure the stretching rod such that it can rotate for the cleaning mode.

In various embodiments, the outlet opening is arranged in a central region of a bottom part of the blow mould. In this case, the bottom part may for example have a raised area in this central region, wherein a so-called injection point of the container may also be advantageously located in this central region during the blowing process.

In some embodiments, the blow mould has discharge openings for discharging the cleaning medium. In this case it is possible that the cleaning agent is applied to the inner wall of the blow mould in a closed state of the blow mould and is then discharged via said discharge openings.

According to various aspects, the discharge openings may be provided in a bottom part of the blow mould. In this way it is possible that the cleaning fluid collects in the bottom region after the cleaning process and is discharged via said openings which are preferably arranged in low regions of the bottom part.

In some exemplary embodiments, the blow mould is arranged in a movable manner. In this case, the blow mould is preferably arranged next to further blow moulds on a carrier wheel.

The present disclosure also relates to an arrangement for transforming plastic preforms into plastic containers and in particular beverage containers, wherein this arrangement comprises a plurality of apparatuses of the type described above and wherein these apparatuses are arranged on a common transport device.

In some aspects, the arrangement may comprise a rotary arrangement, wherein the transport of the apparatuses may take place continuously or else in cycles.

The present disclosure also relates to a method for transforming plastic preforms into plastic containers, wherein the plastic preforms are expanded inside a cavity through the application of a medium to form plastic preforms. This cavity is formed by at least one inner wall of the blow mould and the blow mould can be transferred from an open state to a closed state, wherein a cleaning mode is provided, in which no plastic container is accommodated inside the blow mould and at least one region of the blow mould is cleaned by the application of a cleaning medium. According to the disclosure, the application of the medium can be carried out in a closed state of the blow mould.

In an exemplary method, the cleaning medium is introduced into the cavity through a bottom region of the blow mould, through the stretching rod and/or a blowing nozzle.

Some further advantages and embodiments may become evident from the attached drawings.

BRIEF DESCRIPTION OF THE DRAWINGS

In the drawings:

FIG. 14 shows a view of a blow mould arranged in a clean chamber;

FIG. 15 shows a view to illustrate a cleaning of the blow mould via the stretching rod;

FIGS. 16a,b show two views of an exemplary embodiment according to various aspects of the disclosure;

FIGS. 17a,b show two views of an exemplary further embodiment according to various aspects of the disclosure; and FIG. 18 shows a further view to illustrate the exemplary embodiments shown in FIGS. 17a,b.

DETAILED DESCRIPTION

Figure 1:
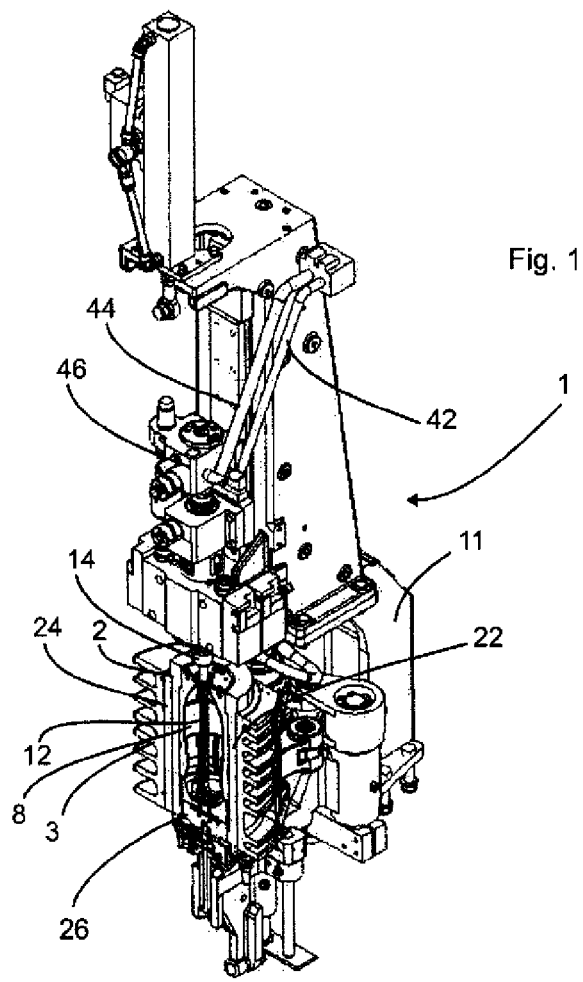
FIG. 1 shows a perspective view of an exemplary apparatus according to various aspects of the disclosure.

FIG. 1 shows an apparatus according to the invention for transforming plastic preforms (not shown) into plastic containers (not shown). This apparatus comprises a main carrier 11, on which a blow mould 2 is arranged in a blow mould carrier 3 (in each case shown only partially).

Formed inside the blow mould 2 is a cavity 4, inside which the plastic preforms are expanded through the application of compressed air to form plastic containers. Furthermore, the apparatus comprises a stretching rod 12, which is movable here in the longitudinal direction L, for stretching the plastic preforms. Reference 22 denotes a first blow mould half and reference 24 denotes a second blow mould half. In addition, the blow mould also has a bottom 26 or a bottom part, which closes the cavity 4 in the downward direction during operation. Reference 14 denotes a pressure application device or blowing nozzle which applies compressed air to the plastic preforms.

In the embodiment shown in FIG. 1, cleaning media can be supplied via supply lines 42, 44. For this purpose, the apparatus also has a valve block 46 which controls the supply of cleaning media. It would also be possible that a cleaning medium is supplied via one supply line and a rinsing medium, such as water for example, is supplied via another supply line.

Figure 2:
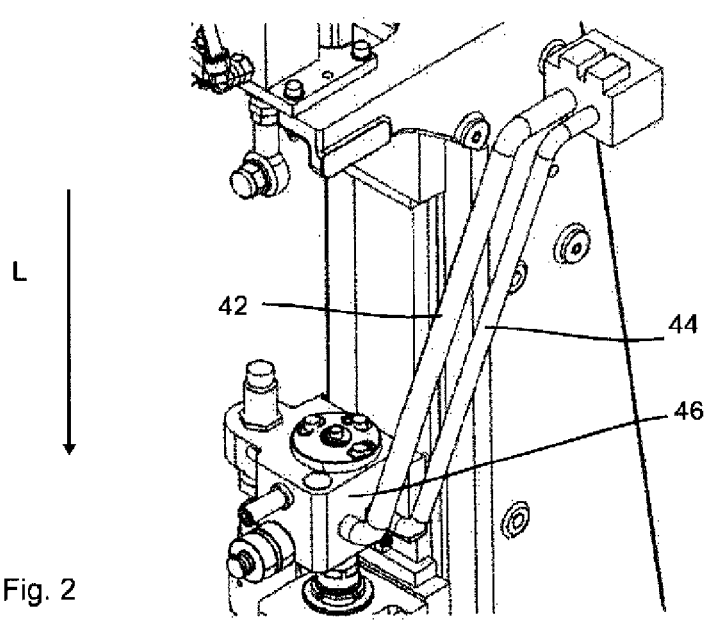
FIG. 2 shows a detail view of the apparatus shown in FIG. 1.

FIG. 2 shows a detail view of the apparatus shown in FIG. 1. In particular, the supply lines 42, 44 are also provided, which are configured here in a flexible manner so that they can maintain the connection despite a movement of the valve block 46 in the longitudinal direction.

Figure 3:
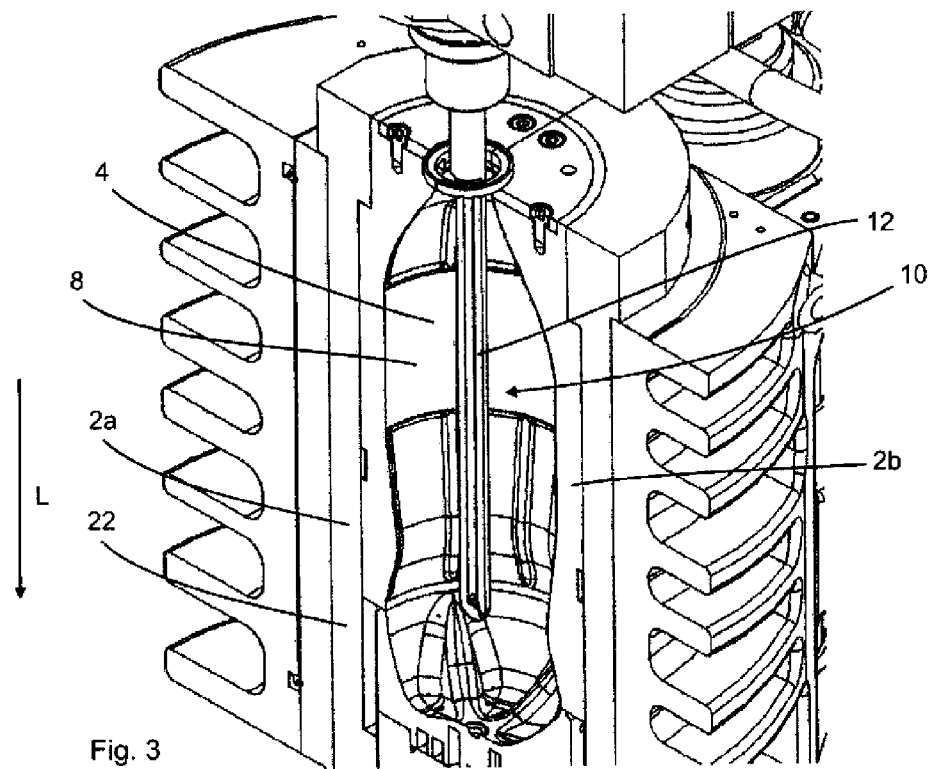
FIG. 3 shows a further detail view of the apparatus shown in FIG. 1.

FIG. 3 shows a further view of a blow mould 2 according to the disclosure. The stretching rod 12 is also shown in a sectional view here. In this embodiment, the cleaning medium is introduced into the blow mould 2 or the cavity 4 via this stretching rod 12. In this case, the stretching rod 12 can be moved in the longitudinal direction L during a special cleaning mode, and during this time can apply the cleaning medium to the inner wall 8 of the blow mould. Reference 10 denotes the cleaning device in its entirety.

Figure 4:
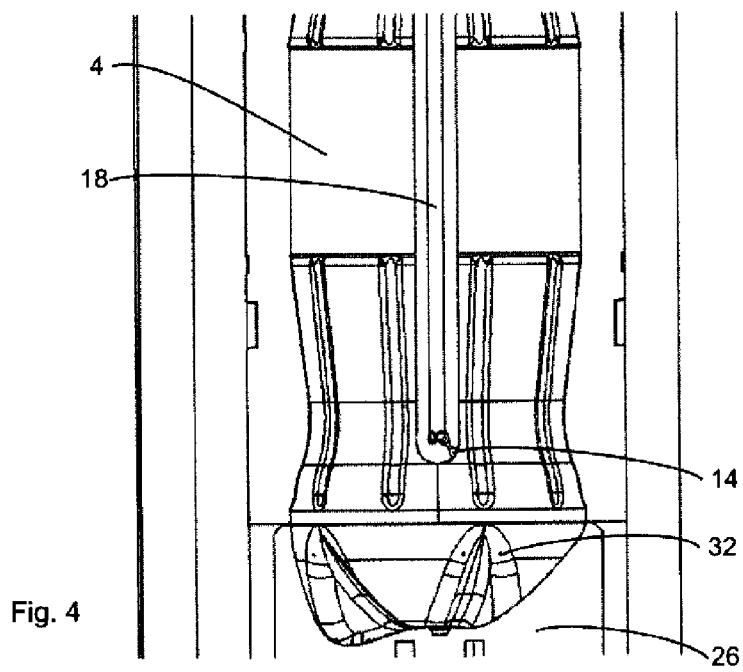
FIG. 4 shows a detail view of the blow mould of an exemplary apparatus according to various aspects of the disclosure.

FIG. 4 shows a further view of the blow mould according to the disclosure. It can be seen that there is arranged in the stretching rod 12 a channel 18 and also an outlet opening 14, through which the medium can exit from the stretching rod 12. Reference 32 here denotes a further opening which is arranged in the bottom part 26. In addition, further openings may be provided in the bottom part 26, which serve as outlets.

Figure 5:
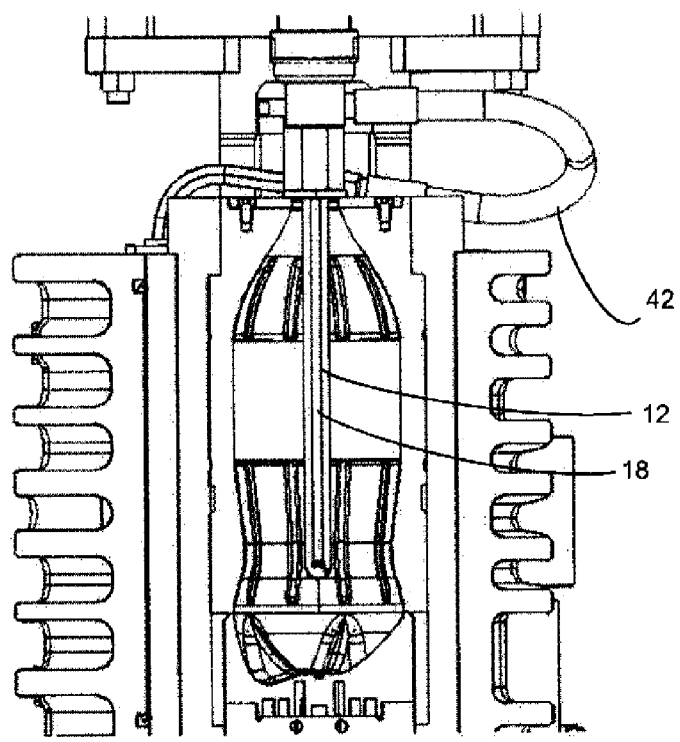
FIG. 5 shows a further detail view of the blow mould of an exemplary apparatus according to various aspects of the disclosure.

FIG. 5 shows a further view of the blow mould according to the disclosure. Here, it is again possible to see the supply line 42, which in this case is in a curved position since the stretching rod 12 is moved into the blow mould 2 to the maximum extent.

Figure 6:
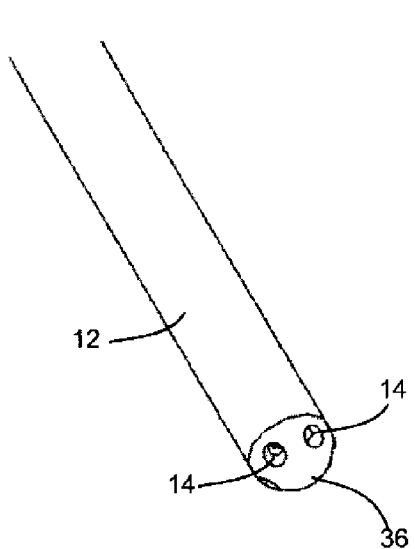
FIG. 6 shows a view of a stretching rod.

FIG. 6 shows a perspective view of a stretching rod 12. This stretching rod 12 here has a plurality of outlet openings 14, through which the cleaning medium can exit from the stretching rod. These openings are formed here in an end section 36, which in this case has a spherical shape. Furthermore, the outlet openings are in each case arranged at an angle, so that the cleaning medium can exit at an angle therefrom.

Figure 7:
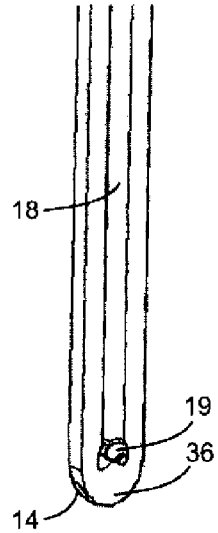
FIG. 7 shows a sectional view of the stretching rod of FIG. 6.

FIG. 7 shows a view of the stretching rod 12 in partial section. Here, too, it is possible to see the channel 18 and also the sub-channels 19 which connect the channel 18 to the outlet openings 14. It would also be possible to provide outlet openings also in further regions of the stretching rod 12. In addition, the channel could also be configured for example in a manner tapering from top to bottom, such that the cleaning medium exits from the stretching rod 12 at the same pressure in each case even if further openings are provided.

Figure 8:
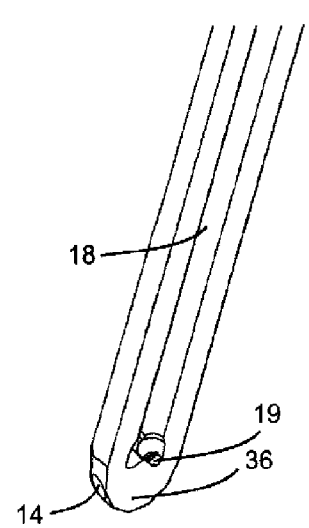
FIG. 8 shows a further sectional view of the stretching rod of FIG. 6.

FIG. 8 shows a further view of a stretching rod. It is again possible to see here the end section 36 and also the outlet opening 14.

Figure 9:
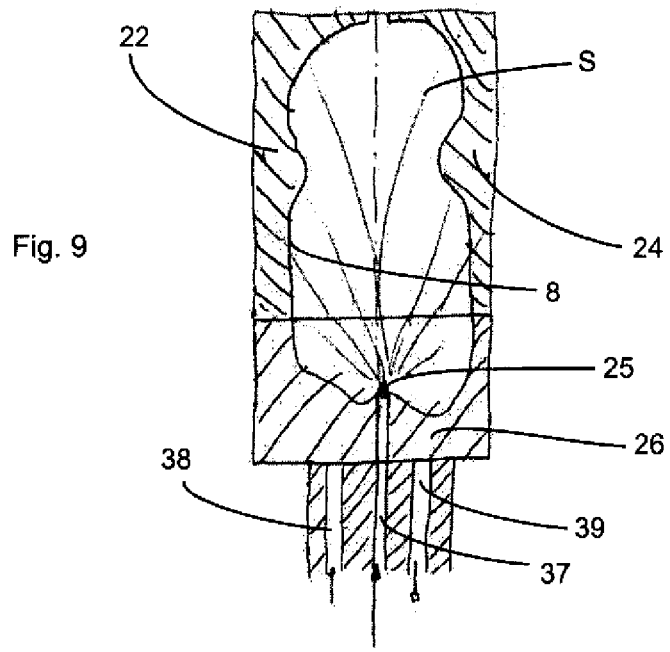
FIG. 9 shows a schematic view of an exemplary blow mould arrangement according to various aspects of the disclosure.

FIG. 9 shows a further schematic view of a blow mould according to the disclosure comprising the two blow mould halves 22 and 24. Reference S denotes jet directions in which the cleaning fluid strikes the inner wall 8 of the blow mould. A corresponding outlet opening or cleaning nozzle is denoted here by reference 25. Reference 37 denotes a channel through which the cleaning medium is supplied, and references 38 and 39 denote forward and return paths for a temperature control medium for the bottom part 26.

Figure 10:
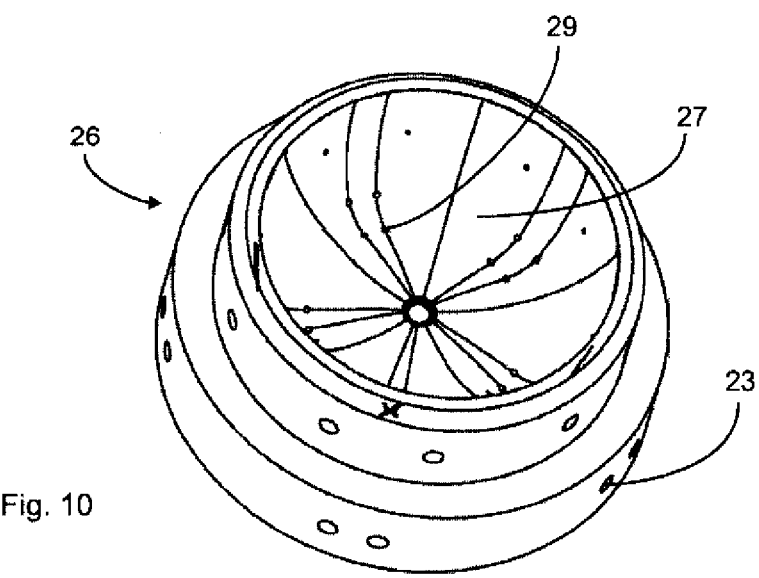
FIG. 10 shows a perspective view of a bottom part.

FIG. 10 shows a perspective view of a bottom part 26. Here, it is possible to see openings 29 which are arranged in a wall 27 of the bottom part. These openings serve for discharging the cleaning medium and are preferably arranged in a relatively low-lying region of the bottom part 26. Reference 23 denotes channels through which the cleaning fluid is discharged.

Figure 11:
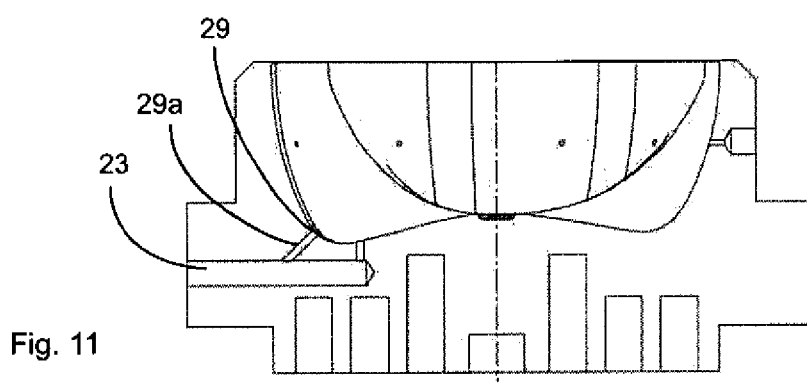
FIG. 11 shows a sectional view of the bottom part shown in FIG. 10.

FIG. 11 shows a sectional view of the bottom part shown in FIG. 10. It is once again possible to see here the channel 23 for discharging the cleaning medium. It is also possible to see that a feed channel 29a extends from the opening 29 towards the channel 23. In this way it is possible to discharge the cleaning medium from a plurality of openings 29.

It would also be possible to introduce a cleaning agent through the bottom part 26 during a cleaning mode. An apparatus in which the blow mould has at least one inlet for a coating agent is known from DE 200 23 423 U1. The subject matter of said disclosure is hereby also fully incorporated by way of reference into the subject matter of the present application. However, while it was proposed in DE 200 23 423 U1 to supply a coating agent, it is now proposed to supply a cleaning agent.

Figure 12:
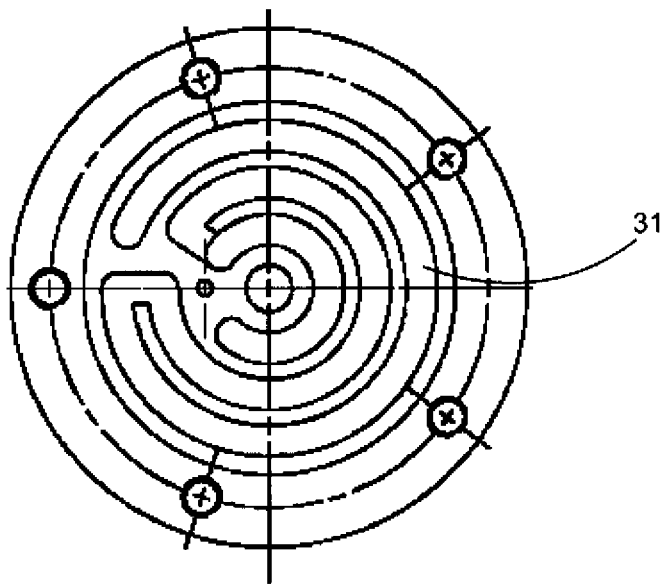
FIG. 12 shows a view of the bottom part from below.

FIG. 12 shows a view of a bottom mould according to the disclosure from below. In particular, a labyrinth region is provided here, which serves for heating purposes.

Figure 13:
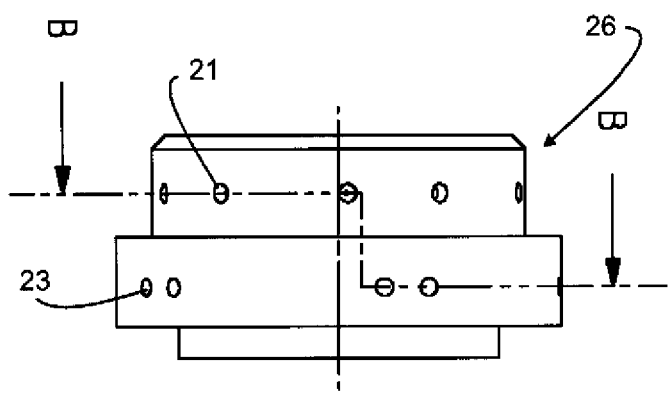
FIG. 13 shows a side view of the bottom part.

FIG. 13 shows a further side view of the bottom part 26. In addition to the channels 23, it is also possible to see here higher located channels 21 which likewise serve for discharging cleaning media.

An apparatus according to the disclosure may also comprise sensor devices which monitor a cleaning state of the inner wall 8 of the blow mould 2. For example, it would be possible that an image recording device optically checks the inner wall 8 in an open state. In addition, it would also be possible that further cleaning devices are provided, such as brushes for example, which mechanically clean the inner wall in an open state. However, it is also possible that such a brush device is introduced into the apparatus in the longitudinal direction L. Furthermore, it would also be possible to apply a plurality of cleaning media one after the other to the inner wall.

Instead of the customary liquid cleaning media mentioned here, however, it would also be possible to use cleaning media in gas or vapour form. In addition to the liquid cleaning media, further sterilisation units could also be provided, such as UV emitters or electron emitters for example, which bring about a disinfection of the inner wall.

Furthermore, additional nozzles or openings could be provided, by means of which rinsing fluid, such as distilled water for example, can be applied to the inner wall 8 of the blow mould 2. Therefore, after the actual cleaning mode using the cleaning fluid, a rinsing mode could also be provided which serves for rinsing out the blow mould 2. This rinsing mode could take place in a closed state of the blow mould. However, it would also be possible that the blow mould 2 is first opened and then the inner wall 8 is rinsed in the open state.

Finally, it would also be possible to arrange cleaning nozzles on the inner wall itself, so that such a cleaning nozzle sprays for example an opposite region of the inner wall 8.

Furthermore, liquid measuring devices may be provided which determine the quantity of cleaning medium applied to the blow mould. In this way, it can be ensured that only a predetermined quantity of cleaning fluid is applied for each cleaning process.

FIG. 14 shows a further embodiment of a blow moulding machine according to the disclosure. In this arrangement, the transformation process takes place inside a sterile chamber 60, through which the individual blow moulds are transported. This sterile chamber is in this case delimited by a plurality of walls 62, 64, wherein here the outer wall 62 is arranged in a stationary manner and the inner wall 64 moves along with the individual blow moulds or the blow mould carriers. The stretching rod 12 is in this case moved through a wall of the sterile chamber 60. In order to achieve a sealing effect here, bellows may be used for example. Reference 66 denotes a sealing device for sealing with respect to one another walls 62, 64 of the sterile chamber 60 which can move relative to one another. This sealing device 60 may be a so-called water lock for example.

Reference 90 denotes a covering device which can be used to seal off the blowing nozzle during a cleaning process. This sealing device may in this case be applied to the blowing nozzle by means of a magnetic element 92, which is located outside the sterile chamber 60 here. However, it would also be possible to move the covering device by means of other elements, such as servo motors, pneumatic or hydraulic drives.

Reference 52 denotes a carrier, on which there is arranged a drive device 54 for moving the stretching rod 12 by means of a carriage 56.

FIG. 15 illustrates a cleaning process for cleaning the blowing nozzle 80 or for Cleaning In Place (CIP). To this end, a cleaning or sterilising medium is introduced, for example, continuously into the channel 18 of the stretching rod 12 and passes from there to the blowing nozzle 80, which during the cleaning process is covered by the covering device 90 (so-called CIP cap), in order to clean this blowing nozzle 80. Reference 98 denotes a sealing device for sealing off the region between the blowing nozzle and the covering device in a covered state of the blowing nozzle.

The cleaning medium is then fed back via a return line 82, 74. In addition, it would also be possible to use, in order to drive the cleaning medium forwards during the cleaning process, the compressed air which is used in the operating mode for expanding the containers.

In addition, it would be possible in the context of cleaning the blowing nozzle also to carry out a cleaning of the valve block which controls the supply of blowing air to the plastic preforms. To carry out this cleaning process too, the covering device 90 may bear against the blowing nozzle. During the operating mode of the machine, the return lines 82, 74 may thus also serve to supply the blowing air for expanding the plastic preforms.

FIGS. 16a and 16b show a further embodiment of the present disclosure, but in this case in the use for a heating device for heating the plastic preforms. A covering device 90, such as a so-called CIP cap for example, is once again provided here and is arranged below the holding element 84. In this embodiment, this covering device is arranged such as to be able to pivot relative to the holding element 84. It is thus possible that these covering devices 90 are mounted pivotably and in such a way as to be able to travel along a chain of furnaces (not shown). It would also be conceivable that the CIP caps 90 are not assigned to each holding element 84 but rather are arranged in a stationary manner in order to allow a cleaning of the holding elements 84 in cycles. It would also be conceivable that the CIP caps 90 temporarily accompany the holding elements 84. In this way, a continuous cleaning process along the accompanying path would also be possible.

A covering device 90 is therefore advantageously arranged on at least one holding element 84, wherein a cleaning fluid can be passed over at least some sections of this covering device 90.

Reference 112 in FIG. 16b accordingly denotes a guide cam arranged in a stationary manner, by means of which a roller 92 arranged on the covering device 90 can be moved in order to pivot the covering device (in the plane of the figure in FIG. 16b). This guide cam is in this case additionally able to pivot or extend by means of a drive device, such as a pneumatic cylinder 114 here. In this case, it is possible that a second cam segment 112c can be displaced relative to a first cam segment 112a in order to adjust the guide cam 112. Reference 112b denotes a corresponding transition segment. By virtue of the adaptation of the cam 112 shown schematically in FIG. 16b, a pivoting process of the covering device can be achieved. However, it is also possible to move or displace jointly the cam segments 112a, 112b and 112c.

Reference 94 in FIG. 16a denotes an articulation such as a pivot shaft, about which the covering device 90 can pivot. Reference 98 denotes a sealing device for sealing off the holding element (in particular during a rinsing process).

For cleaning purposes, a cleaning or sterilising medium runs (for example, continuously) via a rotary distributor in the furnace through the heating mandrel and/or the shielding plate and is returned again from the CIP cap via a return line (not shown). Servo movements would also be conceivable for the caps.

In some aspects, the heating mandrels are in this way sterilised on a rotary furnace (for example selective transformed infrared (STIR) or microwave). An easier rotary distribution would also be obtained in this case. However, it would also be conceivable to clean/sterilise in this way the heating cavities assigned to one or more preforms, that is, for example the resonators or heating pockets.

FIGS. 17a and 17b show a further embodiment of the present disclosure. Here, so-called heating holders 120 or heating pockets are provided, in which the plastic preforms are heated during the operating mode. These heating holders move with the plastic preforms. These heating holders 120 therefore act as irradiating chambers surrounding the preforms. These heating holders may in this case be arranged in the manner of a carousel. References 122 denote infrared emitters which heat the plastic preforms arranged in the holding space 124.

An inner wall of the heating holders 120 may in this case be configured as a ceramic infrared emitter. In addition, it is possible that a rod-shaped infrared emitter (not shown) is introduced into the plastic preforms in order to heat the latter. The plastic preform may in this case be arranged entirely (possibly apart from its mouth) inside the heating holder. However, the holding element 84 or the heating mandrel need not itself be configured as an IR emitter, but rather merely has to be reflective or to hold the plastic preform. Reference 126 denotes a protective screen for the IR emitters.

FIG. 17b shows the heating holder 120 in a cleaning mode. Here, this heating holder is sterilised by being filled with a sterilising medium 130. More specifically, the heating emitters 122 and the reflectors can also be cleaned here. Reference 132 denotes a bottom of the heating holder, which in this case also forms an outlet for the sterilising medium 130. For opening purposes, the bottom can be pivoted about a pivot axle 134. In FIG. 17a, it is also possible to see a return channel 118 which serves for the return of the sterilising medium. The heating holder 120 may in particular be filled through the holding element 84 itself. A dedicated covering device 90 for the mandrel 84 is thus not absolutely necessary. In this way, an immersion of a holding element 84 for the purpose of cleaning or sterilising the outer surfaces is also possible. In other words, the heating holder 120 could in this way perform the function of the covering device 90.

FIG. 18 shows a further view to illustrate a sterilisation process. The cleaning medium is conducted via the channel 104 into a receiving space 140 formed by the covering device 90. From there, the cleaning medium flows back upwards (arrow P2) and through the return channel 118. For this purpose, the covering device 90 is pressed against a stop 152, wherein this stop in the operating mode of the installation can also serve as a stop for the plastic preforms.

Reference 142 denotes a gripper jaw which serves for holding the plastic preforms. These gripper jaws 142 can also be cleaned at the same time. For this purpose, the holding element has a sub-channel 154 which serves for rinsing behind the gripper jaws 142. Reference 98 once again denotes sealing devices for sealing off the covering device 90 with respect to the holding element during the rinsing process. By means of a spring device 146 (which may nevertheless also be an elastic O-ring), the gripper jaw 142 is biased outwards. Reference 144 denotes a holding space for holding the gripper jaws 142. In other words, the holding element 84 is cleaned or sterilised both from inside and from outside.

The covering elements 90 shown in FIGS. 16 to 18 could also be made at least partially from a reflective material in order to reflect radiation, for example, onto the preform, during normal operation of the apparatus.

The cleaning or sterilising fluid may also be used during normal operation for cooling individual elements, such as the heating mandrels.

In addition, it is pointed out that the present disclosure can also be used for those machines which heat the plastic preforms in a non-uniform manner in the circumferential direction thereof (preferential heating). Such an apparatus has been presented for example in German patent application No. 10 2009 021 792.4, which has not yet been published. The content of the disclosure of said application is hereby fully incorporated by way of reference into the content of the disclosure of the present application.

In this case, it would also be possible to clean for example clamps which make contact with the plastic preforms in order thus to apply a non-uniform temperature profile to said preforms. The cleaning could in this case take place via brushes or also via a CIP mode.

In addition, a cleaning of a sterilisation module, as described in PCT/EP2009/059923, could also be carried out. The content of the disclosure of said application is also hereby fully incorporated by way of reference into the content of the disclosure of the present application.

In this case, the holding elements 84 serve to hold the plastic preforms during the transport thereof through the heating device. In the illustrated embodiments, the holding elements grip into the mouths of the plastic preforms to be transported.

In addition, it would also be possible to treat such heating modules, which heat the plastic preforms in a non-uniform manner in the circumferential direction thereof (preferential heating), in a manner similar to that proposed here. For example, a cleaning agent could be introduced via an insertable rod or else via an automaton from outside. A sterilisation module for sterilising the containers could also be cleaned in this way, i.e. a cleaning agent could be introduced via an insertable rod or else via an automaton from outside.

Furthermore, it would also be possible to combine with one another the features shown in the individual figures, that is to say for example to apply features which relate to the heating device shown in FIGS. 16a-18 also to the blow moulding machine or vice versa.

It will be apparent to those skilled in the art that various modifications and variations can be made to the blow moulding machine with cleaning system of the present disclosure without departing from the scope of the invention. Other embodiments of the invention will be apparent to those skilled in the art from consideration of the specification and practice of the invention disclosed herein. It is intended that the specification and examples be considered as exemplary only.

What is claimed is:

1. Apparatus for transforming plastic preforms into containers, comprising:
    at least one blow mould which forms a cavity inside which said plastic preforms can be transformed into containers;
    a pressure application device for applying a medium to the plastic preforms in order to expand said plastic performs against an inner wall of the blow mould delimiting the cavity;
    a stretching rod for stretching the plastic preforms in a longitudinal direction thereof, the stretching rod having an end section pointing towards a bottom of the containers; and
    a cleaning or sterilization device for cleaning or sterilizing at least one region of the blow mould, the cleaning device including at least one outlet opening for a cleaning or sterilizing medium for cleaning or sterilizing the blow mould, said at least one outlet opening including an outlet opening arranged in said end section of the stretching rod and at least at times inside the blow mould.

2. Apparatus according to claim 1, wherein the outlet opening is designed as a nozzle for the cleaning medium.

3. Apparatus according to claim 1, wherein the blow mould has two side members which can be pivoted away from one another, and when in a closed state an interior of said two side members forms the cavity.

4. Apparatus according to claim 1, wherein the blow mould has a bottom member.

5. Apparatus according to claim 1, wherein said at least one outlet opening includes an additional outlet opening arranged in a bottom member of the blow mould or in the pressure application device.

6. Apparatus according to claim 5, wherein the additional outlet opening is arranged in a central region of the bottom member of the blow mould.

7. Apparatus according to claim 1, wherein the blow mould has discharge openings for discharging the cleaning medium.

8. Apparatus according to claim 7, wherein the discharge openings are provided in a bottom member of the blow mould.

9. Apparatus according to claim 1, wherein the blow mould is arranged in a movable manner.

10. Arrangement for transforming plastic preforms into plastic containers, comprising a plurality of apparatuses according to claim 1, wherein the apparatuses are arranged on a common transport device.

11. Method for transforming plastic preforms into plastic containers with the apparatus of claim 1, the method comprising:
    delimiting a cavity with at least one inner wall of a blow mould, inside which the plastic performs are transformable into containers;
    expanding the plastic preforms against the inner wall of the blow mould delimiting the cavity through the application of a medium, via the pressure application device, to form plastic performs;
    stretching, with the stretching rod, the plastic performs in a longitudinal direction thereof; and
    cleaning, with the cleaning device, at least one region of the blow mould by the application of a cleaning medium via said at least one outlet opening.

12. Method according to claim 11, further comprising:
moving the blow mould from an open state to a closed state when no plastic container is accommodated inside the blow mould; and
introducing the cleaning medium into the cavity through at least one of a bottom region of the blow mould.

13. Apparatus for transforming plastic preforms into containers, comprising:
at least one blow mould movable between an open configuration and a closed configuration, an inner wall of said blow mould delimiting a cavity which plastic preforms can be transformed into containers;
a pressure application device configured to apply a medium to the plastic preforms in order to expand said plastic performs against the inner wall of the blow mould;
a stretching rod configured to stretch the plastic preforms in a longitudinal direction thereof, the stretching rod having an end section pointing towards a bottom of the containers; and
a sterilizing device structured and arranged to sterilize regions of the blow mould, the sterilizing device including at least one outlet opening for directing a sterilizing medium toward at least one region of the blow mould for sterilizing said region, said at least one outlet opening being arranged at least at times inside the blow mould, said at least one outlet opening being arranged in the pressure application device.

14. Apparatus according to claim 13, wherein said at least one outlet opening is arranged in at least one of the stretching rod and bottom member of the blow mould.

15. Apparatus according to claim 14, wherein the stretching rod has an end section pointing towards a bottom of the containers, and the outlet opening is arranged in said end section of the stretching rod.

16. Apparatus according to claim 14, wherein the outlet opening is arranged in a central region of the bottom member of the blow mould.

17. Apparatus according to claim 13, wherein the blow mould has discharge openings for discharging the sterilizing medium.

18. Apparatus according to claim 17, wherein the discharge openings are provided in a bottom member of the blow mould.

19. Apparatus according to claim 13, further comprising a valve block configured to control the supply of blowing air, the valve block being connected to the at least one outlet opening.

20. Apparatus according to claim 13, wherein the blow mould is arranged next to further blow moulds on a carrier wheel.

21. Apparatus according to claim 13, further comprising a reservoir for the sterilizing medium and a rotary distributor.

22. Apparatus according to claim 13, further comprising a sterile chamber, through which the individual moulds are transported.

23. Apparatus according to claim 22, wherein the sterile camber is delimited by a plurality of walls, wherein two walls can move relative to one another.

* * * * *